(12) United States Patent
Kwon

(10) Patent No.: US 11,945,494 B2
(45) Date of Patent: Apr. 2, 2024

(54) STEERING COLUMN OF VEHICLE

(71) Applicant: HL MANDO CORPORATION, Pyeongtaek-si (KR)

(72) Inventor: Hyun Bi Kwon, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 17/907,537

(22) PCT Filed: Apr. 2, 2021

(86) PCT No.: PCT/KR2021/004136
§ 371 (c)(1),
(2) Date: Sep. 27, 2022

(87) PCT Pub. No.: WO2021/210823
PCT Pub. Date: Oct. 21, 2021

(65) Prior Publication Data
US 2023/0331284 A1 Oct. 19, 2023

(30) Foreign Application Priority Data
Apr. 14, 2020 (KR) ........................ 10-2020-0045166

(51) Int. Cl.
*B62D 1/184* (2006.01)
*B62D 1/187* (2006.01)
(52) U.S. Cl.
CPC ............. *B62D 1/184* (2013.01); *B62D 1/187* (2013.01)

(58) Field of Classification Search
CPC .......... B62D 1/184; B62D 1/187; B62D 1/185
See application file for complete search history.

(56) References Cited

U.S. PATENT DOCUMENTS

| 4,538,478 A | * | 9/1985 | Sato | ........................ B62D 1/183 74/540 |
|---|---|---|---|---|
| 9,849,905 B2 | * | 12/2017 | Anspaugh | .............. B62D 1/184 |
| 10,246,118 B2 | * | 4/2019 | Baumeister | ............ B62D 1/184 |
| 10,259,485 B2 | * | 4/2019 | Jones | ..................... B62D 1/184 |
| 2011/0156380 A1 | * | 6/2011 | Dietz | ..................... B60R 21/09 280/775 |
| 2014/0373663 A1 | * | 12/2014 | Hahn | ..................... B62D 1/184 74/493 |
| 2015/0090068 A1 | | 4/2015 | Anspaugh | |
| 2016/0297463 A1 | * | 10/2016 | Tomaru | .................. B62D 1/184 |
| 2020/0339177 A1 | * | 10/2020 | Thebault | ................ B62D 1/184 |

FOREIGN PATENT DOCUMENTS

| CN | 105408188 B | * | 1/2019 | ............ B62D 1/184 |
|---|---|---|---|---|
| JP | 2015107801 A | | 6/2015 | |
| KR | 10-0885108 B1 | | 2/2009 | |
| KR | 20190061692 A | | 6/2019 | |
| KR | 102151218 B1 | * | 9/2020 | |
| KR | 102181872 B1 | * | 11/2020 | |
| WO | 2019129574 A1 | | 7/2019 | |

* cited by examiner

*Primary Examiner* — Drew J Brown
(74) *Attorney, Agent, or Firm* — Harvest IP Law, LLP

(57) ABSTRACT

According to the present embodiments, the lever handling and tilt handling of a driver can be improved by reducing noise caused by collisions between components, which can be generated if the driver manipulates a lever from a locking state into an unlocking state or if the driver adjusts the angle of a steering wheel.

10 Claims, 12 Drawing Sheets

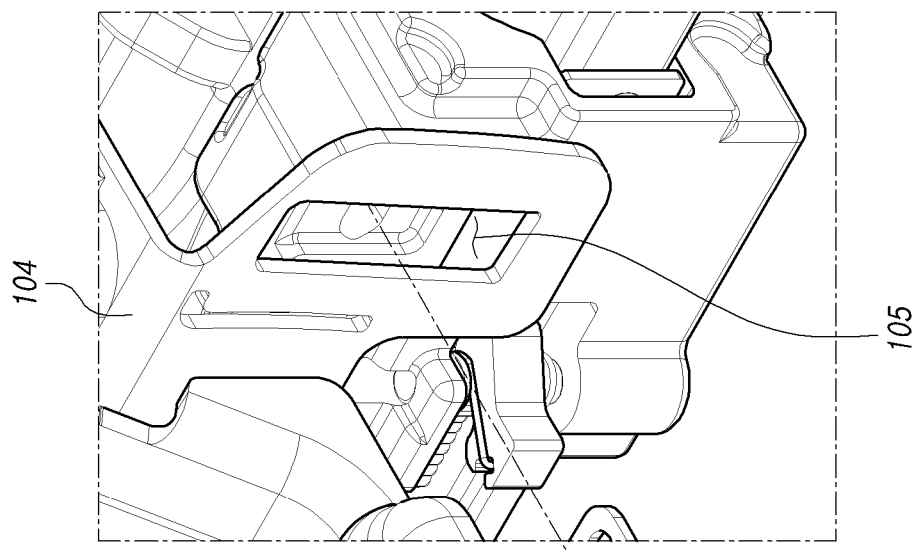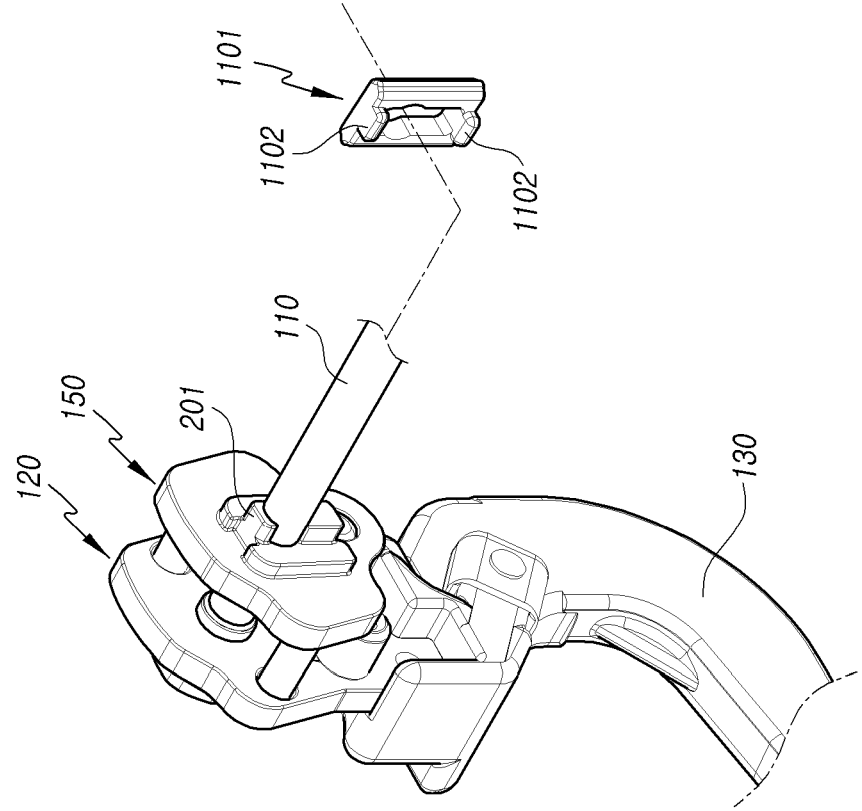
FIG.11

STEERING COLUMN OF VEHICLE

CROSS REFERENCE TO RELATED APPLICATIONS

This application is a National Stage of International Application No. PCT/KR2021/004136 filed on Apr. 2, 2021, claiming priority to Korean Patent Application No. 10-2020-0045166 filed on Apr. 14, 2020, the disclosures of which is incorporated herein by reference in its entirety.

TECHNICAL FIELD

The present embodiments relate to a steering column of a vehicle and, more specifically, a steering column of a vehicle capable of reducing noise due to inter-component collision that may arise when the driver switches the lever from the locking state to unlocking state or when the driver adjusts the angle of the steering wheel, thereby enhancing the driver's lever manipulation and tilting.

BACKGROUND ART

In general, the steering column of a vehicle comes with telescoping and tilting features by which the driver may adjust the protrusion and tilt angle of the steering wheel to fit his height or body shape to enable smooth steering.

In manual-type steering columns, telescoping and tilting of the steering column are locked or unlocked by the driver's lever manipulation. The conventional steering column has a structure in which the lever manipulation is supported by a spring. The driver shift of the lever from the unlocking to locking state is performed in the opposite direction to the elastic force of the spring, the shifting feel is improved. However, the driver's shift of the lever from the locking to unlocking state is performed in the same direction as the elastic force of the spring, so that the lever is momentarily rotated, causing inter-component collision and noise and thus deterioration of the shifting feel.

Further, in the case where the driver adjusts the angle of the steering wheel in upper and lower directions on the conventional steering column, when the tilting of the steering column is stopped, noise occurs due to inter-component collision, deteriorating the driver's manipulation feel.

DETAILED DESCRIPTION OF THE INVENTION

Technical Problem

The present embodiments have been conceived in the foregoing background and relate to a steering column of a vehicle capable of reducing noise due to inter-component collision that may arise when the driver switches the lever from the locking state to unlocking state or when the driver adjusts the angle of the steering wheel, thereby enhancing the lever manipulation and tilting.

Technical Solution

According to the present embodiments, there may be provided a steering column of a vehicle, comprising a plate bracket having a tilt slit formed in a tilt direction, a fixing member penetrated by an adjust bolt and having a support inserted into the tilt slit, a rotating member penetrated by the adjust bolt, provided to face the fixing member, having a guide slit circumferentially formed and a coupling hole communicating with an circumferential end of the guide slit, and coupled with a lever to be rotated by manipulating the lever, a guide pin having an end inserted into the guide slit and another end coupled to the fixing member, and a first damper inserted into the coupling hole to be supported by or removed from the guide pin when the rotating member rotates.

Advantageous Effects

According to the present embodiments, it is possible to reduce noise due to inter-component collision that may arise when the driver switches the lever from the locking state to unlocking state or when the driver adjusts the angle of the steering wheel, thereby enhancing the lever manipulation and tilting.

BRIEF DESCRIPTION OF THE DRAWINGS

FIG. 11 is an exploded perspective view illustrating a steering column for a vehicle according to the present embodiments.

MODE FOR CARRYING OUT THE INVENTION

Figure 1:
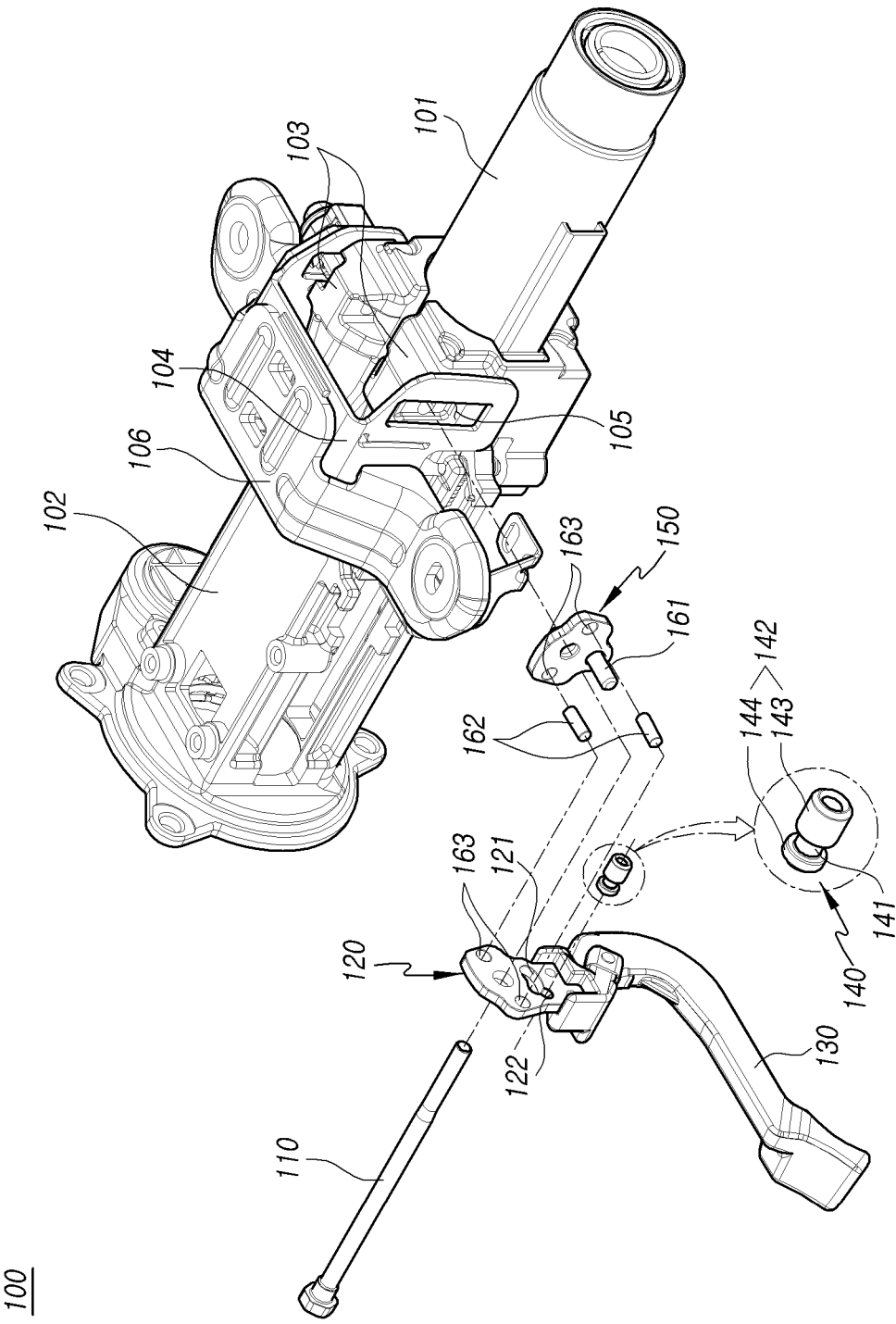
FIGS. 1 and 2 are exploded perspective views illustrating a steering column of a vehicle according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
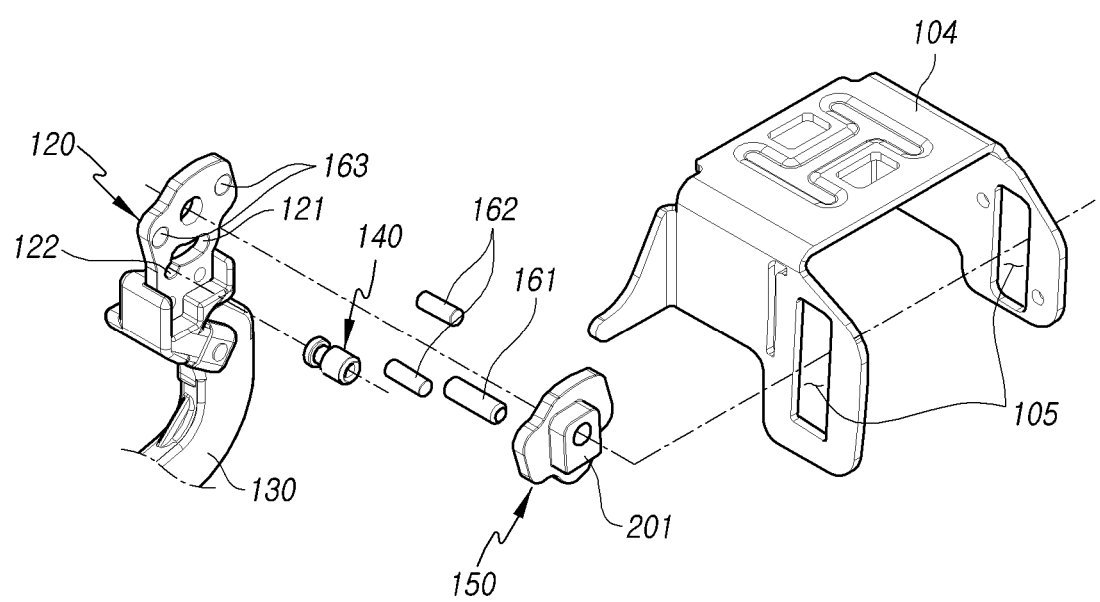
Figure 3:
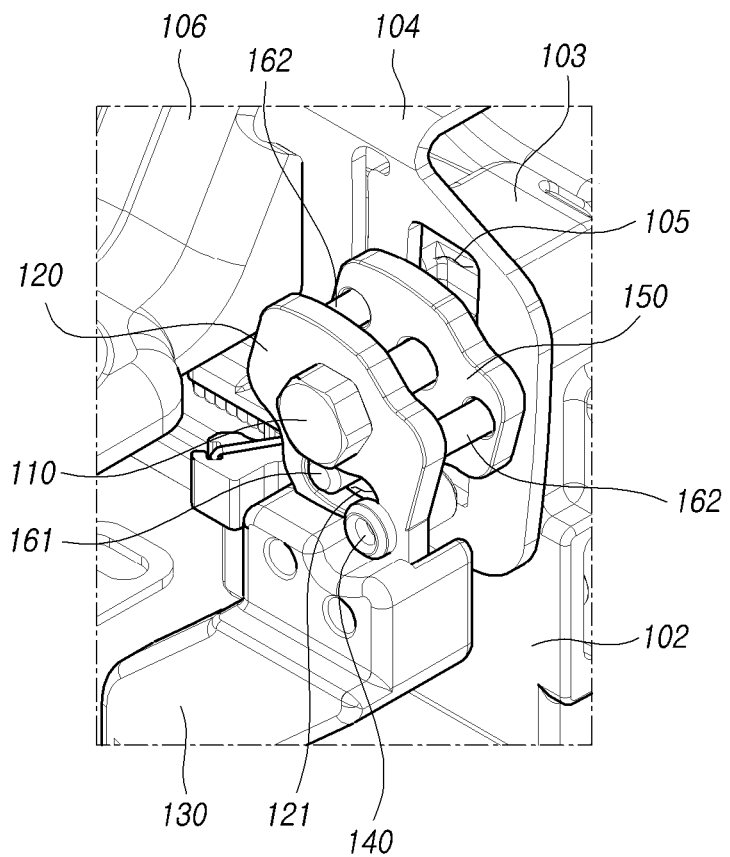
FIG. 3 is a perspective view illustrating an assembled state FIG. 1.
Figure 4:
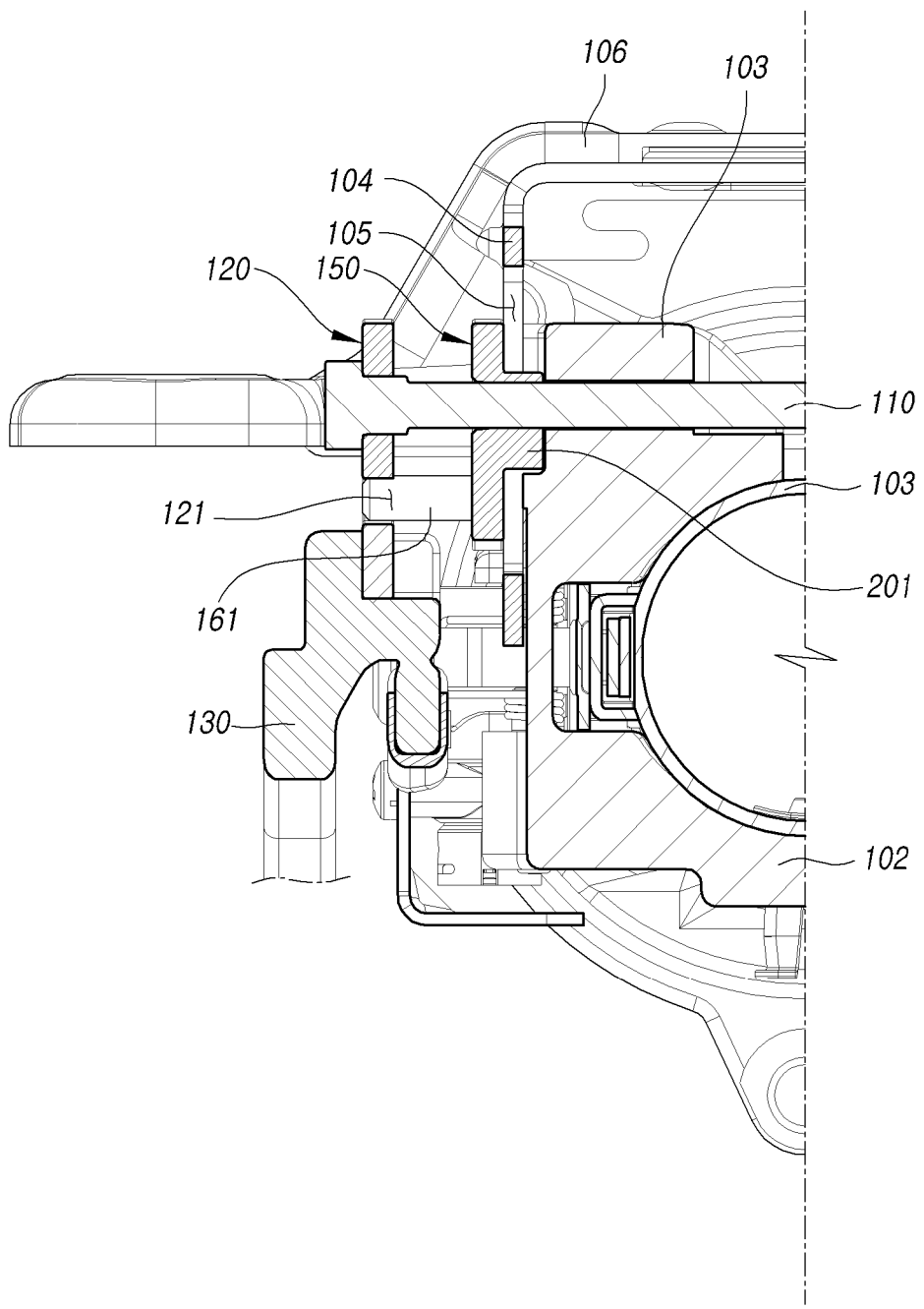
FIG. 4 is a cross-sectional view of FIG. 3.
Figure 5:
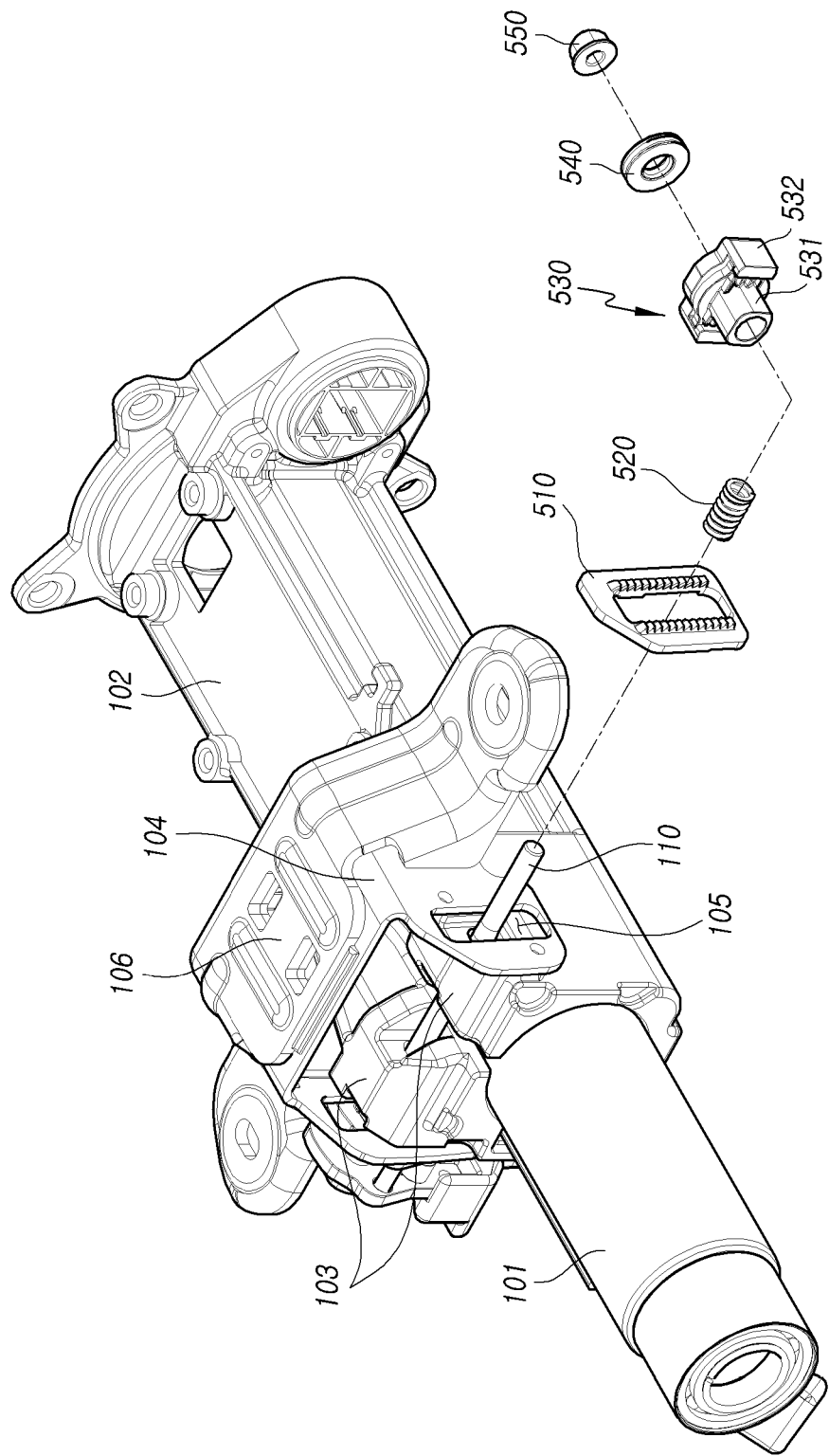
FIG. 5 is an exploded perspective view illustrating a steering column for a vehicle according to the present embodiments.
Figure 6:
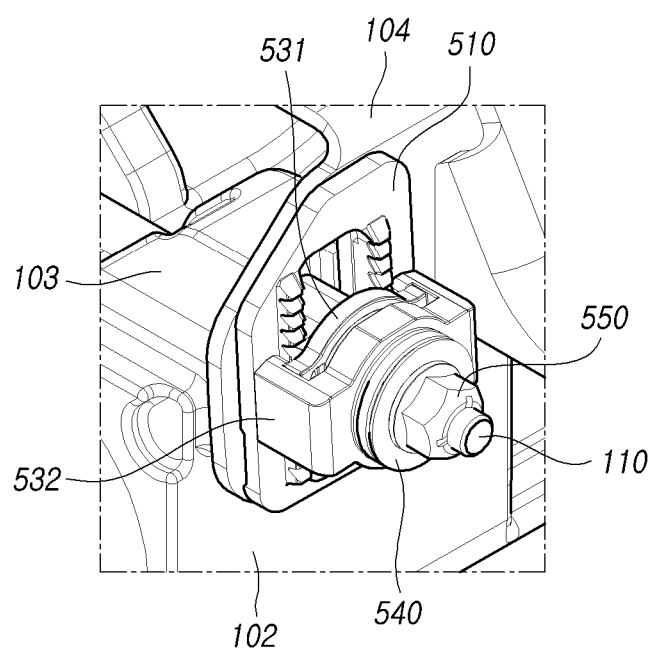
FIG. 6 is a perspective view illustrating an assembled state FIG. 5.
Figure 7:
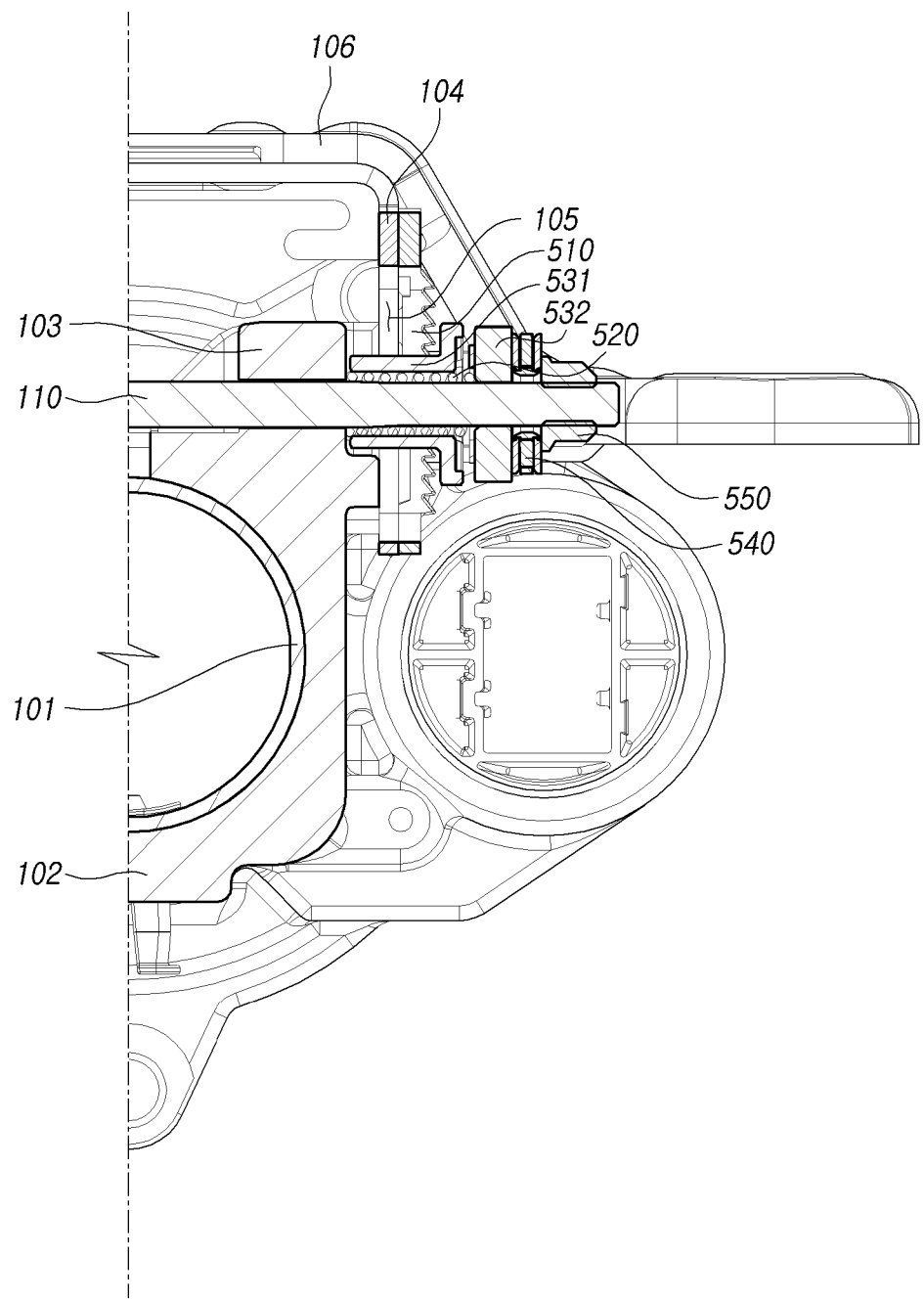
FIG. 7 is a cross-sectional view of FIG. 6.
Figure 8:
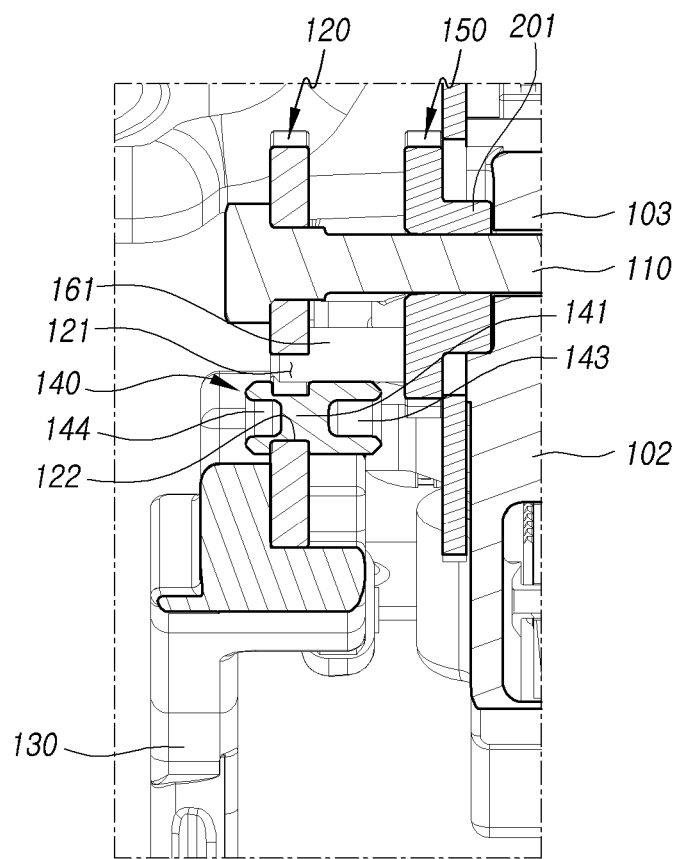
FIG. 8 is a cross-sectional view of FIG. 3.
Figure 9:
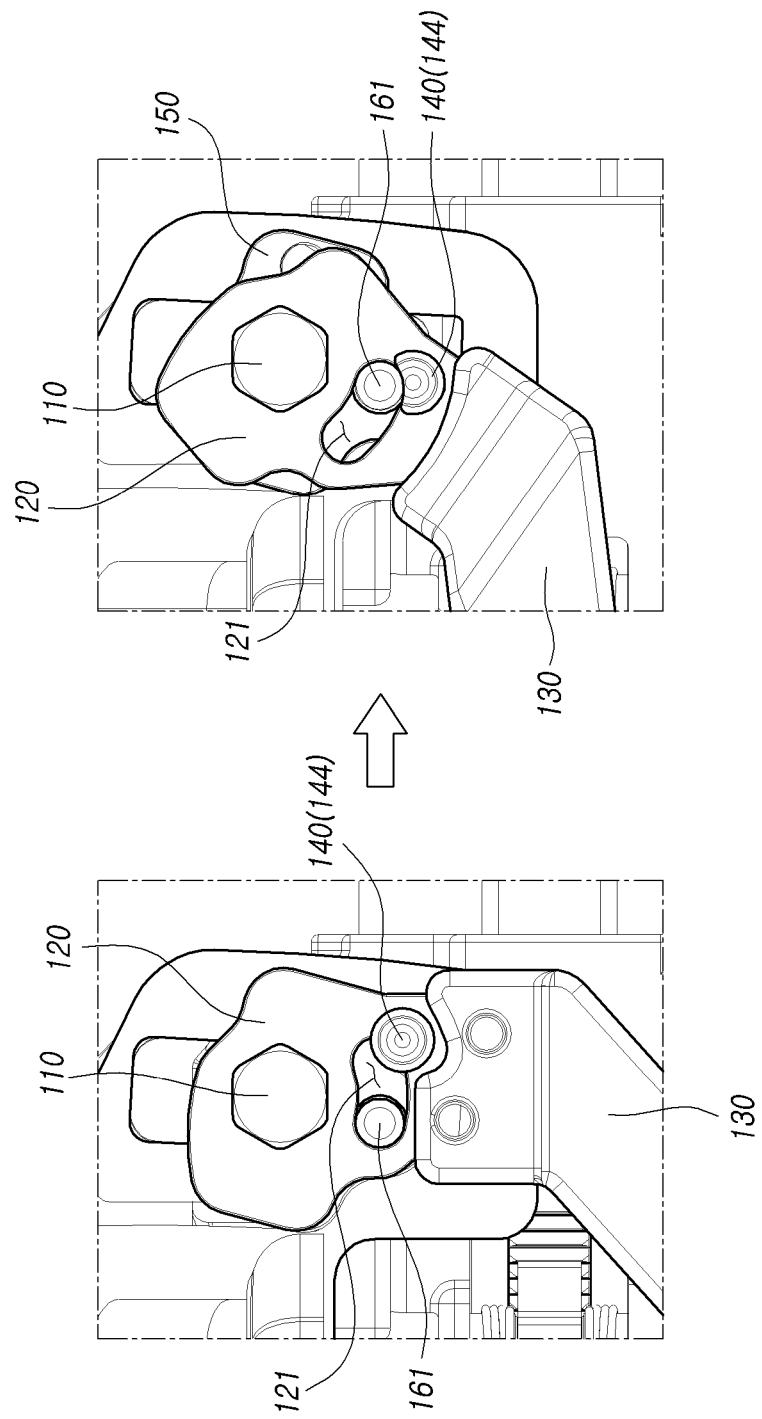
FIGS. 9 and 10 are side views illustrating an operation state of a steering column of a vehicle according to the present embodiments.
Figure 10:
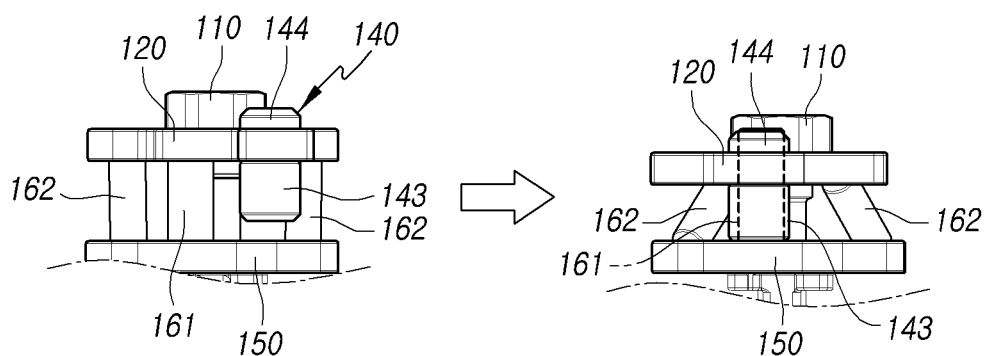
Figure 12:
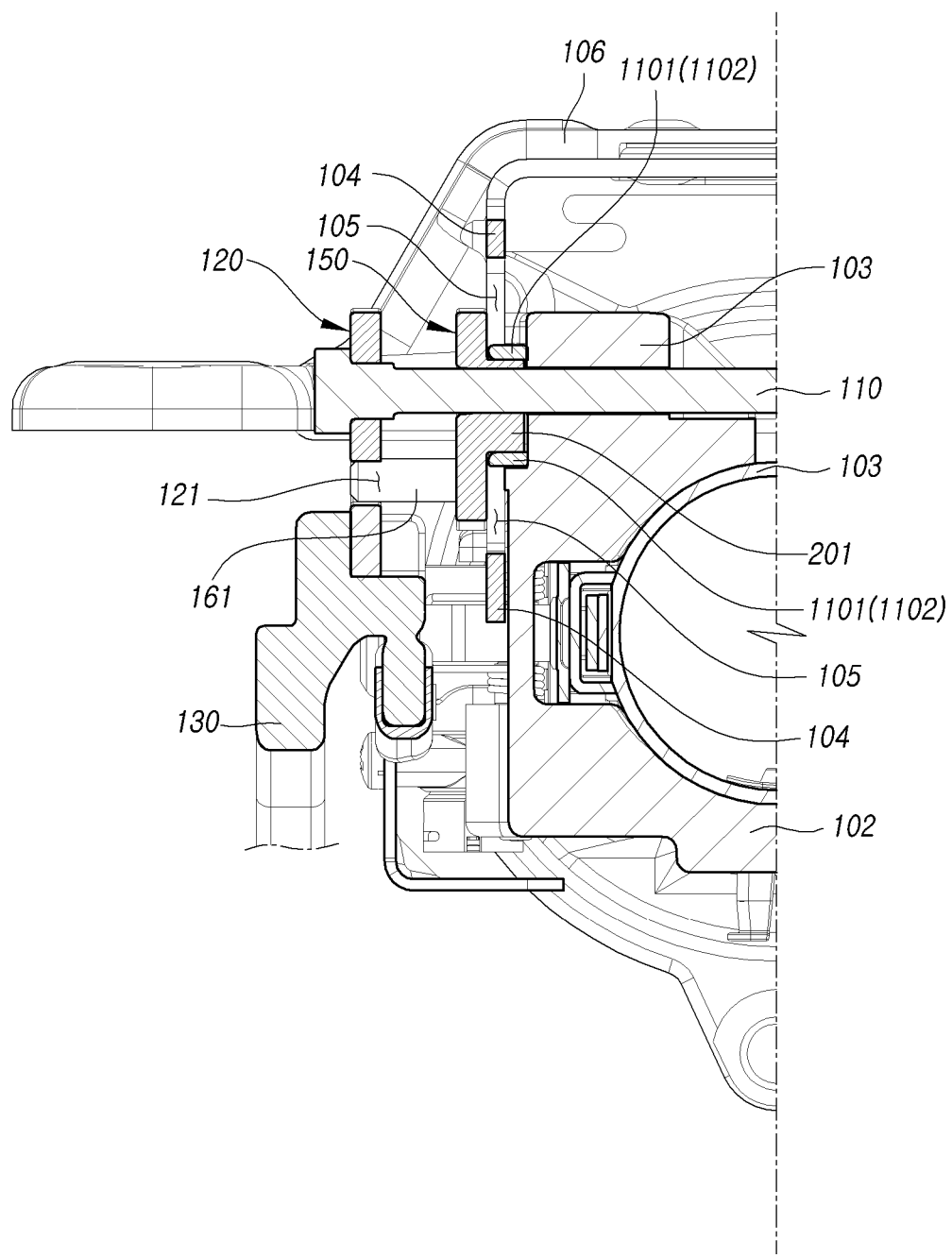
FIG. 12 is a cross-sectional view illustrating an assembled state of FIG. 11.

FIGS. 1 and 2 are exploded perspective views illustrating a steering column of a vehicle according to the present embodiments. FIG. 3 is a perspective view illustrating an assembled state FIG. 1. FIG. 4 is a cross-sectional view of FIG. 3. FIG. 5 is an exploded perspective view illustrating a steering column for a vehicle according to the present embodiments. FIG. 6 is a perspective view illustrating an assembled state FIG. 5. FIG. 7 is a cross-sectional view of FIG. 6. FIG. 8 is a cross-sectional view of FIG. 3. FIGS. 9 and 10 are side views illustrating an operation state of a steering column of a vehicle according to the present embodiments. FIG. 11 is an exploded perspective view illustrating a steering column for a vehicle according to the present embodiments. FIG. 12 is a cross-sectional view illustrating an assembled state of FIG. 11.

According to the present embodiments, a steering column 100 of a vehicle comprises a plate bracket 104 having a tilt slit 105 formed in a tilt direction, a fixing member 150 penetrated by an adjust bolt 110 and having a support 201 inserted into the tilt slit 105, a rotating member 120 penetrated by the adjust bolt 110, provided to face the fixing member 150, having a guide slit 121 circumferentially formed and a coupling hole 122 communicating with an circumferential end of the guide slit 121, and coupled with a lever 130 to be rotated by manipulating the lever 130, a guide pin 161 having an end inserted into the guide slit 121 and another end coupled to the fixing member 150, and a first damper 140 inserted into the coupling hole 122 to be supported by or removed from the guide pin 161 when the rotating member 120 rotates.

First, a structure in which tilting is locked or unlocked by the manipulation of the lever 130 is described. Then, a feature of reducing noise during tilting and manipulation of the lever 130 by the first damper 140 and the second damper 1101 is then described.

The upper column 101 inserted on the inner circumferential surface of the lower column 102 is coupled with a steering shaft (not shown), and the lower column 102 is coupled to the vehicle body by the plate bracket 104 and the mounting bracket 106.

A pair of distance portions 103 facing widthwise each other are provided on the outer circumferential surface of the lower column 102, and the plate bracket 104 is supported on the outer surfaces of the distance portions 103.

The plate bracket 104 is provided with a tilt slit 105 formed in a tilt direction, and the tilt slit 105 is formed at a portion supported by the outer surface of the distance portion 103 of the plate bracket 104.

The adjust bolt 110 is inserted into the tilt slit 105 and provided to pass through the distance portions 103. As the adjust bolt 110 slides in the tilt direction in the tilt slit 105, tilting of the steering shaft is carried out.

A first end of the adjust bolt 110 is provided with a fixing member 150 and a rotating member 120, and a second end thereof is provided with a spring 520 and a movable gear 530.

Although the figure illustrates an embodiment in which the head portion is provided at the first end of the adjust bolt 110 and a nut 550 is coupled to the second end, it is apparent that the opposite case is also possible.

Referring to FIGS. 1 to 4, the fixing member 150, the rotating member 120, and the like are described.

The fixing member 150 and the rotating member 120 are penetrated by the adjustment bolt 110 and are provided to face each other, and the lever 130 is coupled to the rotating member 120 so that, when the lever 130 is manipulated, the rotating member 120 is rotated while the fixing member 150 is supported on one side surface of the plate bracket 104 without rotation.

The fixing member 150 is provided with a support 201 inserted into the tilt slit 105. As the two opposite sides of the support 201 are supported by the plate bracket 104, the fixing member 150 is engaged with the plate bracket 104 and is not rotated when the lever 130 is manipulated.

The rotating member 120 is provided with the guide slit 121 and the coupling hole 122, The guide slit 121 is formed circumferentially around the portion penetrated by the adjust bolt 110, and the coupling hole 122 is formed to communicate with a circumferential end of the guide slit 121.

Both the guide slit 121 and the coupling hole 122 may be formed to pass through the rotating member 120 as shown in the drawings.

The guide pin 161 has a first end inserted into the guide slit 121 and a second end coupled to the fixing member 150, and when the rotating member 120 is rotated, the second end of the guide pin 161 is slid on the guide slit 121, and the guide pin 161 is circumferentially supported by the rotating member 120 at both circumferential ends of the guide slit 121, and rotation of the rotating member 120 and manipulation of the lever 130 are stopped.

The guide pin 161 may be formed integrally with the fixing member 150.

Meanwhile, in the locking state, the guide pin 161 is positioned on the second end, in the circumferential direction, of the guide slit 121 and, in the unlocking state, the guide pin 161 is positioned on the first end, in the circumferential direction, of the guide slit 121 (refer to FIG. 9). As described below, when the lever 130 is rotated from the locking state to the unlocking state, the first damper 140 is supported by the guide pin 161 and, when the lever 130 is rotated from the unlocking state to the locking state, the first damper 140 is removed from the guide pin 161.

Subsequently, when the lever 130 is manipulated, the rotating member 120 is not only rotated about the axis of the adjust bolt 110 but is also slid together with the adjust bolt 110 to be closer to or away from the fixing member 150.

As described below, when the lever 130 is rotated from the locking state to the unlocking state, the adjust bolt 110 is slid from the first to second side, and the movable gear 530 is disengaged from the fixed gear 510, unlocking tilting. When the lever 130 is rotated from the unlocking state to the locking state, the adjust bolt 110 is slid from the second to first end, and the movable gear 530 is engaged with the fixed gear 510, locking tilting.

The spring 520 provided at the second end of the adjust bolt 110 provides an elastic force to the second side of the adjust bolt 110. A support pin 162 may be provided between the fixing member 150 and the rotating member 120 to allow the rotating member 120 to rotate while sliding.

Both the ends of the support pin 162 come in rolling contact with the fixing member 150 and the rotating member 120 so that when the rotating member 120 rotates, the support pin 162 is tilted between the fixing member 150 and the rotating member 120.

In other words, when the lever 130 is rotated from the locking state to the unlocking state, the support pin 162 is tilted to be inclined from the axial direction of the adjust bolt 110, and the adjust bolt 110 and the rotating member 120 supported by the head portion of the adjust bolt 110 are slid from the first to second side by the elastic force from the spring 520. When the lever 130 is rotated from the unlocking state to the locking state, the rotating member 120 and the adjust bolt 110 whose head portion is supported by the rotating member 120 are slid from the second to first side, with the support pin 162 parallel with the axial direction of the adjust bolt 110.

A rolling recess 163 where an end of the support pin 162 is seated may be formed in the fixing member 150 and the rotating member 120.

Although the support pin 162 is not provided, an inclined surface which is circumferentially inclined may be formed in each of the fixing member 150 and the rotating member 120 and, the rotating member 120 may be slid on the fixing member 150 with the inclined surfaces supported by each other.

Referring to FIGS. 5 to 7, the fixed gear 510 having gear teeth is coupled to the second side surface of the plate bracket 104, and the movable gear 530 provided at the second end of the adjust bolt 110 is engaged with the fixed gear 510 or disengaged from the fixed gear 510 to lock or unlock the tilting by the slide of the adjust bolt 110.

The spring 520 is supported on the outer surface of the distance portion 103 and one side surface of the movable gear 530, and a thrust bearing 540 and a nut 550 are provided on the second side of the movable gear 530.

In other words, the spring 520 is supported on the distance portion 103 to exert an elastic force to the movable gear 530, thrust bearing 540, and nut 550, thereby providing an elastic force to the second side of the adjust bolt 110.

The movable gear 530 may include a gear member 531 having gear teeth engaged with the gear teeth of the fixed gear 510, a supporting member 532 supported by the spring 520, and an elastic member provided between the gear member 531 and the supporting member 532.

In other words, the supporting member 532 is axially fixed to the adjust bolt 110 by the spring 520 and the nut 550, and the elastic member presses the gear member 531 to the fixed gear 510 against the supporting member 532.

As described above, when the lever 130 is manipulated, the adjust bolt 110 is slid by the support pin 162 and the spring 520, locking or unlocking tilting. When the lever 130 is rotated from the unlocking state to the locking state, the spring 520 is compressed, so that the driver's lever manipulation feel is enhanced. However, when the lever 130 is rotated from the locking state to the unlocking state, the spring 520 is decompressed, so that the lever 130 is momentarily rotated, causing inter-component collision and noise and resultantly deteriorating the driver's lever manipulation feel. To prevent this, the first damper 140 is provided.

Referring to FIGS. 8 to 10, as described above, the first damper 140 is inserted into the coupling hole 122 which communicates with the circumferential end of the guide slit 121. When the lever 130 is in the locking state, the guide pin 161 is positioned on the second end, in the circumferential direction, of the guide slit 121 and, when the lever 130 is in the unlocking state, the guide pin 161 is positioned on the first end, in the circumferential direction, of the guide slit 121 so that when the lever 130 is rotated from the locking state to the unlocking state, the first damper 140 is supported by the guide pin 161 and, when the lever 130 is rotated from the unlocking state to the locking state, the first damper 140 is removed from the guide pin 161.

The first damper 140 includes a small diameter portion 141 inserted into the coupling hole and a large diameter portion 142 formed to have a larger diameter than the small diameter portion 141.

In other words, a portion of the large diameter portion 142 axially overlaps the guide slit 121, and the portion of the large diameter portion 142, which axially overlaps the guide slit 121, is supported and compressed by the guide pin 161, thereby performing damping.

Further, the large diameter portion 142 may include a first large diameter portion 143 extending from the small diameter portion 141 to the fixing member 150.

When the lever 130 is rotated from the locking state to the unlocking state, the first large diameter portion 143 is supported by the fixing member 150, performing secondary damping.

When the lever 130 is rotated from the locking state to the unlocking state, the rotating member 120, together with the adjust bolt 110, is slid toward the fixing member 150 by the elastic force of the spring 520, so that the first large diameter portion 143 is supported and compressed by the fixing member 150, performing damping.

In other words, the first large diameter portion 143 may be supported by the guide pin 161 and the fixing member 150 while performing circumferential damping and axial damping both.

Further, the large diameter portion 142 may include a second large diameter portion 144 extending from the small diameter portion 141 in the opposite direction from the fixing member 150.

As the rotating member 120 is slid toward the fixing member 150 when the lever 130 is rotated from the locking state to the unlocking state, the first end of the guide pin 161 is rendered to protrude to a side of the rotating member 120, and the second large diameter portion 144 is supported by the protruding first end of the guide pin 161, increasing the area where the guide pin 161 is supported by the first damper 140 and thus enhancing damping performance.

The first large diameter portion 143 and the second large diameter portion 144 may be hollow. In other words, if the first large diameter portion 143 and the second large diameter portion 144 have high rigidity, the lever 130 may not be fixed in the unlocking state. Thus, the first large diameter portion 143 and the second large diameter portion 144 may be formed to be hollow to reduce rigidity, allowing the lever 130 to be stably fixed in the unlocking state while performing damping.

As described above, when the lever 130 is rotated from the locking state to the unlocking state, the lever 130 may be prevented from being momentarily rotated by the damping of the first damper 140, thereby reducing noise due to inter-component collision and enhancing the driver's lever manipulation.

Meanwhile, referring to FIGS. 11 and 12, the support 201 may be coupled with a second damper 1101 supported by the plate bracket 104 at two opposite ends, in the tilt direction of the tilt slit 105 when the fixing member 150 slides on the tilt slit 105.

As described above, during tilting, the support 201 inserted in the tilt slit 105 is supported by the plate bracket 104, and the fixing member 150 is slid. The second damper 1101 is provided to reduce noise caused when the support 201 is stopped while being supported by the plate bracket 104 in the tilt direction, at both the ends, in the tilt direction, of the tilt slit 105.

In other words, the second damper 1101 has a protrusion 1102 supported on the upper and lower surface, in the tilt direction, of the support 201, and the protrusion 1102 is supported by the plate bracket 104 in the tilt direction, earlier than the support 201, thus reducing noise attributed to collision.

As described above, during tilting, the support 201 is prevented from colliding with the plate bracket 104 by the damping of the second damper 1101, reducing noise due to inter-component collision and enhancing the driver's tilting manipulation.

By the so-shaped steering column of a vehicle, it is possible to reduce noise due to inter-component collision that may arise when the driver switches the lever from the locking state to unlocking state and when the driver adjusts the angle of the steering wheel, thereby enhancing the lever manipulation and tilting.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

The instant patent application claims priority under 35 U.S.C. 119(a) to Korean Patent Application No. 10-2020-0045166, filed on Apr. 14, 2020, in the Korean Intellectual Property Office, the disclosure of which is herein incorporated by reference in its entirety. The present patent application claims priority to other applications to be filed in other countries, the disclosures of which are also incorporated by reference herein in their entireties.

The invention claimed is:

1. A steering column of a vehicle, comprising:
a plate bracket having a tilt slit formed in a tilt direction;
a fixing member penetrated by an adjust bolt and having a support inserted into the tilt slit;
a rotating member penetrated by the adjust bolt, provided to face the fixing member, having a guide slit circumferentially formed and a coupling hole communicating with a circumferential end of the guide slit, and coupled with a lever to be rotated by manipulating the lever;
a guide pin having an end inserted into the guide slit and another end coupled to the fixing member; and
a first damper inserted into the coupling hole to be supported by or removed from the guide pin when the rotating member rotates,
wherein the first damper is supported from two substantially perpendicular directions by the guide pin and the fixing member when the lever is rotated from a locking state to an unlocking state and is spaced apart from the guide pin and the fixed member when the lever is rotated from the unlocking state to the locking state.

2. The steering column of claim 1, wherein a support pin having two opposite ends in rolling contact with the fixing member and the rotating member is provided between the fixing member and the rotating member.

3. The steering column of claim 2, wherein a rolling recess where an end of the support pin is seated is formed in the fixing member and the rotating member.

4. The steering column of claim 1, wherein the first damper includes a small diameter portion inserted into the coupling hole and a large diameter portion formed to have a larger diameter than the small diameter portion.

5. The steering column of claim 4, wherein the large diameter portion includes a first large diameter portion extending from the small diameter portion to the fixing member.

6. The steering column of claim 5, wherein the first large diameter portion is supported by the fixing member when the lever is rotated from the locking state to the unlocking state.

7. The steering column of claim 5, wherein the first large diameter portion is formed to be hollow.

8. The steering column of claim 4, wherein the large diameter portion includes a second large diameter portion extending from the small diameter portion in an opposite direction from the fixing member.

9. The steering column of claim 8, wherein the second large diameter portion is formed to be hollow.

10. The steering column of claim 1, wherein the support is coupled with a second damper supported by the plate bracket at two opposite ends, in the tilt direction, of the tilt slit when the fixing member is slid in the tilt slit.

* * * * *